United States Patent [19]
Tanabe

[11] Patent Number: 5,327,226
[45] Date of Patent: Jul. 5, 1994

[54] METHOD AND SYSTEM FOR AUTOMATICALLY ADJUSTING COLOR BALANCE OF A TV CAMERA

[75] Inventor: Kazuhiro Tanabe, Tachikawa, Japan
[73] Assignee: Hitachi Denshi Kabushiki Kaisha, Tokyo, Japan
[21] Appl. No.: 92,476
[22] Filed: Jul. 16, 1993
[30] Foreign Application Priority Data
  Jul. 17, 1992 [JP] Japan .................. 4-213591
[51] Int. Cl.$^5$ ............................ H04N 9/73
[52] U.S. Cl. .................. 348/188; 348/223
[58] Field of Search .......... 358/10, 29, 29 C; H04N 9/73

[56] References Cited
U.S. PATENT DOCUMENTS
  5,179,437 1/1973 Kawada et al. ............ 358/10

FOREIGN PATENT DOCUMENTS
  50-19410 7/1975 Japan .................. H04N 9/535

Primary Examiner—Mark R. Powell
Attorney, Agent, or Firm—Antonelli, Terry, Stout & Kraus

[57] ABSTRACT

In an automatic color-balance setup system for a color TV camera, a chart board having a white pattern, a black pattern and a gray pattern is imaged by the color TV camera for the purpose of color balance adjustment. The image signal data appearing at the output of the TV camera are analyzed to compute and determine the white level, the black level and the gray level, and the locations of the image signal data corresponding to the individual levels, measurement regions for the white level, the black level and the gray level are automatically determined color balance automatic setup.

10 Claims, 3 Drawing Sheets

METHOD AND SYSTEM FOR AUTOMATICALLY ADJUSTING COLOR BALANCE OF A TV CAMERA

BACKGROUND OF THE INVENTION

1. Field of the Invention

This invention relates to a method and system for automatically adjusting the color balance of a color TV camera.

2. Description of the Related Art

An automatic color-balance setup system for automatically adjusting the differences of the circuit characteristics of the three channels, R, G and B, of a color TV camera is disclosed in, for example, JP-B-50-19410. The cited system uses a reference chart board on which specific patterns representing a white level, a black level and a gray level are drawn to exhibit a guaranteed color balance among them. The manner of automatic color-balance adjustment in the proposed system has been such that the reference chart board is imaged by the color TV camera, and the camera output signal representing the image is displayed on a monitor TV set. Thus, in the proposed system, it has been required to adjust the position of the reference chart board relative to the TV camera, so that the pattern of the white level, that of the black level and that of the gray level can be accurately displayed at the specific positions respectively on the screen of the monitor TV set.

FIG. 1 shows schematically the arrangement of a conventional system. The structure and operation of the conventional system will now be described by reference to FIG. 1. Referring to FIG. 1, white, black and gray patterns for generating signals of reference levels to be used for the purpose of automatic setup are drawn on a reference chart board 1. The patterns drawn on the chart board 1 are imaged by a color TV camera 2, and the image signal is displayed on the screen of a monitor 3. The color balance is adjusted by an automatic setup device 2a. In this case, the locations where the signals of white, black and gray levels respectively are derived on the screen are determined beforehand, and the data of the individual signals corresponding to those locations are used to execute the automatic setup. In the case of the conventional system shown in FIG. 1, the reference numerals 7, 8 and 9 designate a white level measurement region, a black level measurement region and a gray level measurement region respectively on the screen of the monitor 3. Therefore, in order that the automatic setup can be accurately executed, it is necessary to adjust the relative positions of the TV camera 2 and the reference chart board 1, so that the white level measurement region 7 is to be included in the range of a white level generation pattern 4, the black level measurement region 8 is to included in the range of a black level generation pattern 5, and the gray level measurement region 9 is to be included in the range of a gray level generation pattern 6. This positioning of the reference chart board 1 relative to the TV camera 2 has been executed hitherto while a user is observing the screen of the monitor 3 by user's eyes.

Therefore, the conventional system has had the following three problems (1) to (3):

(1) The positioning of the reference chart board 1 relative to the TV camera 2 requires a considerably long time.

(2) Because the system is based on specifying the measurement regions of the individual levels, a reference chart board of a specific type can only be used.

(3) When at least one pattern located at the position corresponding to one of the individual level measurement regions of the reference chart board 1 is partly fouled or damaged, the reference chart board 1 cannot be used for the purpose of automatic setup anymore.

SUMMARY OF THE INVENTION

It is an object of the present invention to provide an automatic color-balance setup method and system in which a white level, a black level and a gray level are determined by analysis of image signal data derived by imaging a reference chart board by a color TV camera, and, on the basis of the thus determined white, black and gray levels, most suitable measurement regions for the individual levels are automatically determined.

Another object of the present invention is to provide an automatic setup method and system in which the color balance is adjusted on the basis of the image signal data derived from the thus determined measurement regions.

According to the present invention which detects the measurement regions in the manner described above, the positioning of the reference chart board relative to the color TV camera becomes unnecessary, and the position as well as the shape of each of the white, black and gray patterns on the reference chart board is in no way limited. Further, even when the reference chart board may be partly fouled or damaged, most suitable white, black and gray parts of the patterns on the reference chart board except the partly fouled or damaged part can be selected as the measurement regions, so that not only a specific chart board but also a conventional chart board can be used for the purpose of automatic color-balance setup.

DESCRIPTION OF THE PREFERRED EMBODIMENTS

The present invention will now be described in detail by reference to the accompanying drawings.

Figure 1:
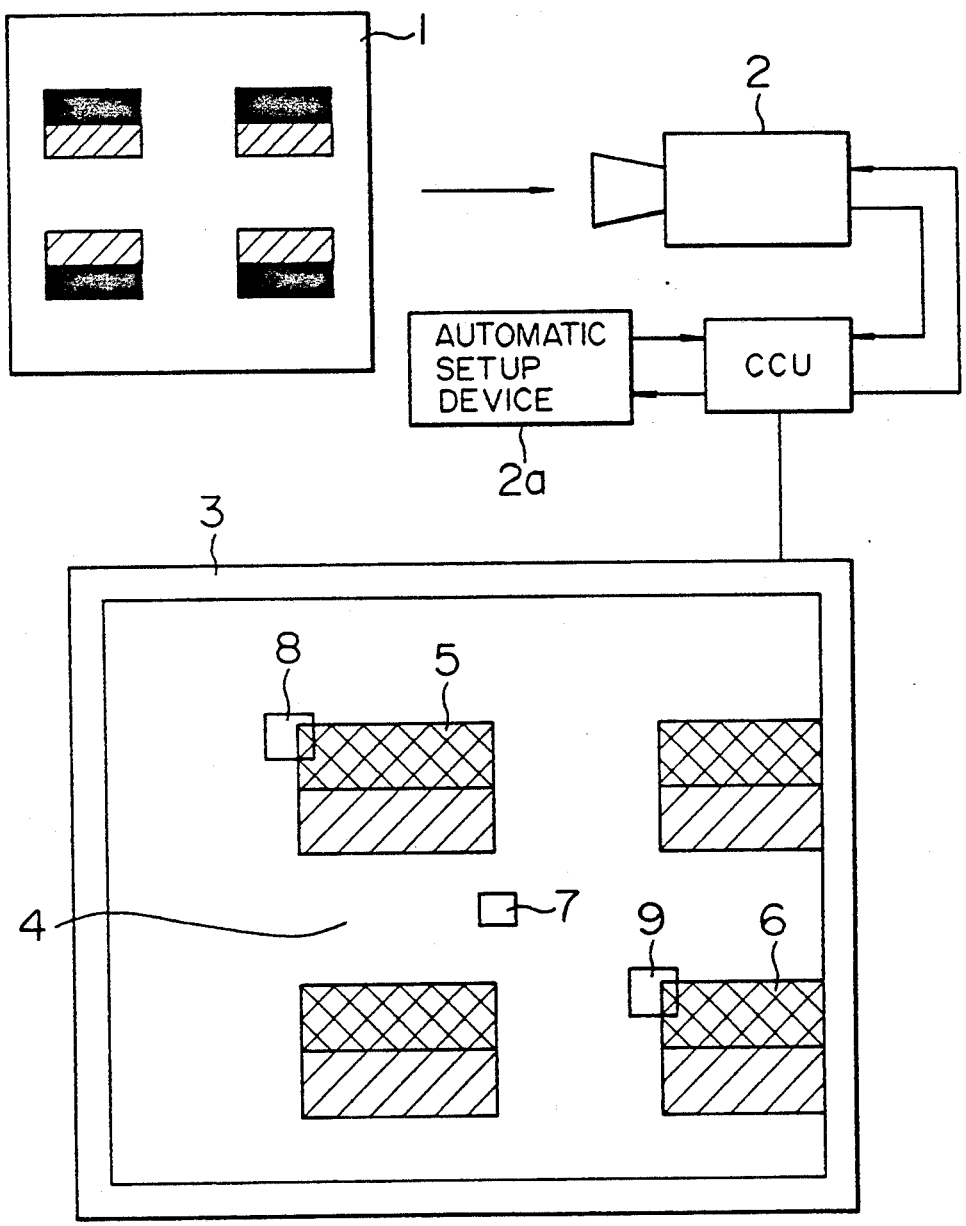
FIG. 1 shows schematically the arrangement of a prior art color balance automatic setup system.
Figure 2:
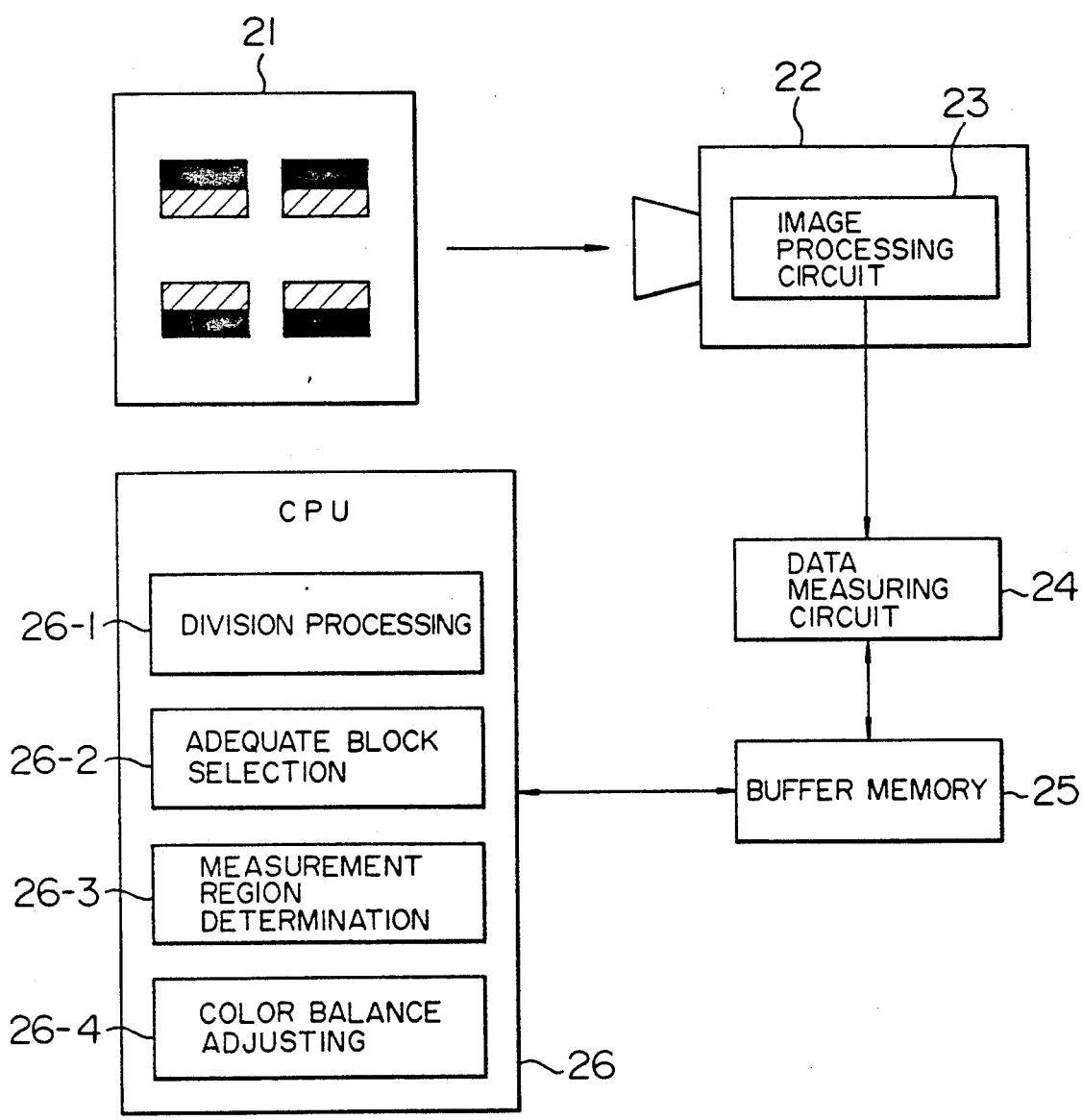
FIG. 2 is a block diagram showing the basic structure of an embodiment of the color balance automatic setup system according to the present invention.

FIG. 2 is a block diagram showing the basic structure of an embodiment of an automatic color-balance setup system of the present invention. Referring to FIG. 2, a chart board 21 having a plurality of white, black and gray patterns drawn thereon is imaged by a TV camera 22, and image signal data obtained by an image processing circuit 23 in the TV camera 22 are divided into predetermined unit blocks, and a data measuring circuit 24 computes the maximum value, the minimum value and an average value for each unit block. These values are supplied to a CPU 26 through a buffer memory 25.

The CPU 26 includes a division processing section 26-1, an adequate block selecting section 26-2, a measurement region determining section 26-3 and a color balance adjusting section 26-4. The CPU 26 decides a white level, black level gray level from the above information stored in the buffer memory 25, and automatically detects the locations where these levels are measured. More precisely, in the present invention, the image signal data in each unit block that is a small region having predetermined sampling points are successively processed. The manner of processing is such that the maximum value, minimum value and average value for each unit block are first computed, and blocks (referred to hereinafter as an adequate block), each of which the difference between the maximum value and the minimum value lies within an allowable range are then selected.

Figure 3:
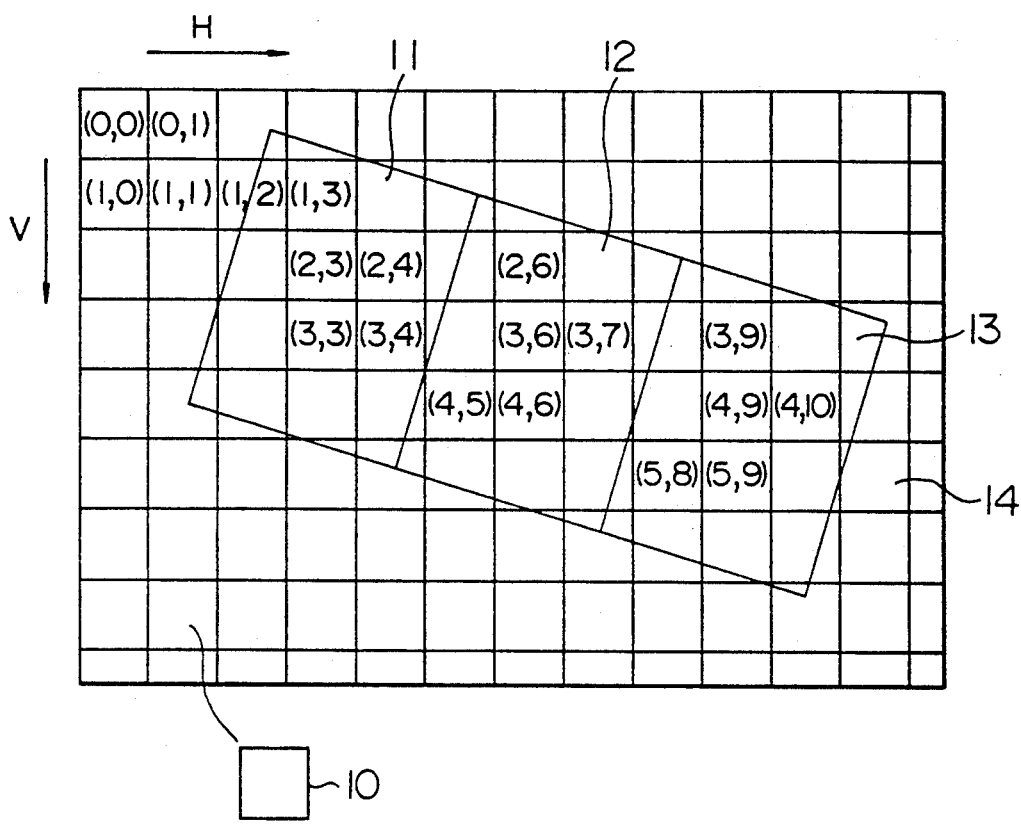
FIG. 3 illustrates the concept of dividing the image of the reference chart board into a plurality of blocks according to an embodiment of the automatic setup method of the present invention.

An embodiment of the automatic setup method according to the present invention will now be described. FIG. 3 illustrates the concept for the selection of such an adequate block.

Referring to FIG. 3, the image of the reference chart board displayed on the screen of the monitor includes a region 11 of a level A, a region 12 of a level B, a region 13 of a level C and a region 14 of a level D. The screen of the monitor displaying the image of the reference chart board is divided into a plurality of blocks 10. In FIG. 3, the individual levels are set as follows: the level A=100; the level B=150; the level C=200; and the level D=50. The value of the data is the same in each of the blocks. That is, the value of all the data in, for example, the region 11 of the level A is 100.

Thus, the maximum value=the minimum value=the average value=50 in the block 10 lying at the location (1,1). On the other hand, the maximum value=100 and the minimum value=50 in the block 10 lying at the location (1,2). Also, the maximum value=the minimum value=the average value=100 in the block 10 lying at the location (1,3). Suppose now that the value E0 of the allowable range of the difference between the maximum value and the minimum value in the adequate block is E0=10. In this case, the locations of the adequate blocks in the region 11 of the level A are (1,3), (2,3), (2,4), (3,3) and (3,4). Similarly, the locations of the adequate blocks in the region 12 of the level B are (2,6), (3,6), (3,7), (4,5) and (4,6). Also, the locations of the adequate blocks in the region 13 of the level C are (3,9), (4,9), (4,10), (5,8) and (5,9). After the locations of the adequate blocks on the entire screen of the monitor are detected together with the average values in the adequate blocks, the distribution of the average values is based to determine the white level, the black level and the gray level used for the automatic setup of the color balance.

Figure 4:
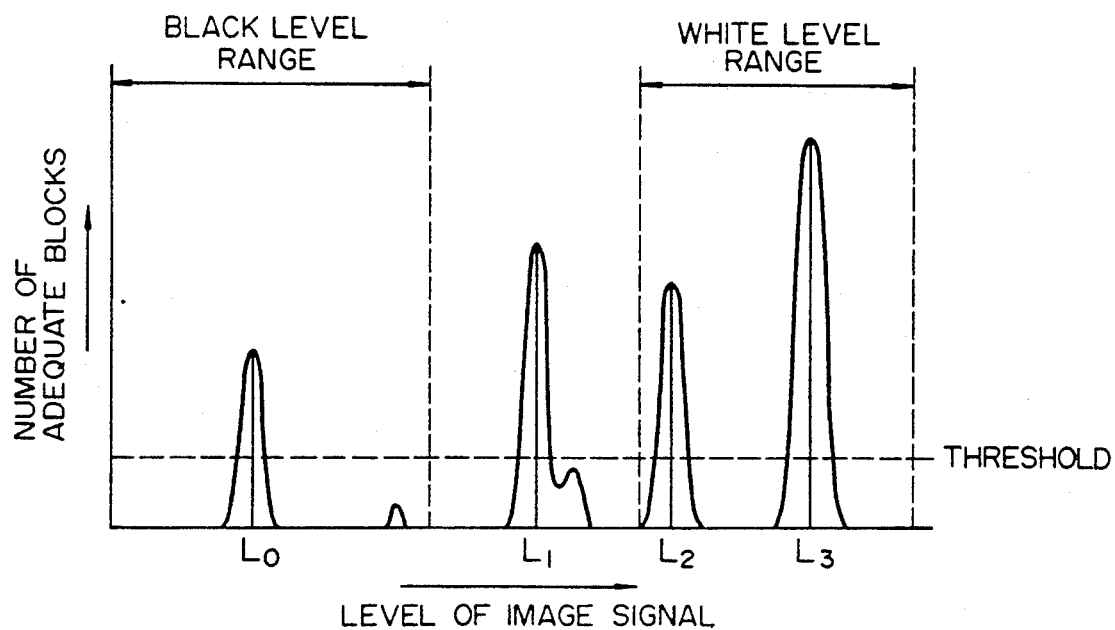
FIG. 4 illustrates the distribution of the number of adequate blocks relative to the level of the image signal in the embodiment of the method of the present invention shown in FIG. 3.

The data in the individual regions of the reference chart board actually displayed on the screen of the monitor are not uniform unlike those shown in FIG. 3, and it seems that the data are rather distributed as shown in FIG. 4. This is attributable to various factors including nonuniform relative densities of patterns of various levels on the chart board on which the patterns are drawn, the presence of a fouled or damaged part of the patterns on the chart board, the difference in the refractive index due to the angular position of the chart board relative to the light source or surface roughness of the chart board, or nonuniform operation of parts inside the TV camera. More sharp peaks should appear in the distribution of the number of the adequate blocks shown in FIG. 4, because FIG. 4 represents the distribution of the average values in the adequate blocks. However, the distribution shown in FIG. 4 is simplified for the purpose of merely illustrating the concept of the automatic color-balance setup according to the present invention. In FIG. 4, the horizontal axis represents the level of the image signal, and the vertical axis represents the number of the adequate blocks.

First, an allowable range (a white level range) where the white level should exist and another allowable range (a black level range) where the black level should exist are determined beforehand. The purpose of this allowable range determination is to inspect, for example, the quantity of light incident on the reference chart board. For example, when the result of analysis of the distributed data shown in FIG. 4 proves that the data are not utterly present in the white level range, this means that the quantity of incident light is insufficient, or the white level does not actually exist, or the data are too nonuniform to be used for the measurement even when the white level actually exists. In such a case, occurrence of an error is displayed on the screen of the monitor, and the operator is instructed to properly deal with the trouble. Herein, it is a prerequisite that various conditions including the setting of the lens opening inside the TV camera are maintained constant. Also, in the case of the automatic setup on the basis of the black level only (adjustment of the color balance on the basis of the black level only), the white level is unnecessary. In this case, the system does not decide that an error appears even when the white level does not exist. In such a case, the type of the color balance automatic setup is based to automatically make a proper decision.

The white level is determined on the basis of the data in the adequate blocks located in the white level range. For this purpose, one of the following three methods (1) to (3) is used:

(1) The maximum value of the data in the adequate blocks located in the white level range is determined as the white level.

(2) Among the peaks appearing in the distribution of the adequate blocks located in the white level range, the level of the highest peak is selected, and that level is determined as the white level. In FIG. 4, the level L3 represents the white level.

(3) Among the peaks appearing in the distribution of the adequate blocks located in the white level range, the peak of the largest number of the adequate blocks is selected as the peak of the white level, and that level is determined as the white level. In FIG. 4, the level L3 represents the white level. Further, when, at the time of determination of the white level, it is preferable to provide such an additional condition that those adequate blocks whose total number is larger than a predetermined setting (the threshold shown in FIG. 4) are only the subject of determination of the white level. This is advantageous to preclude those spurious adequate blocks in which the color balance is not guaranteed due to, for example, occurrence of fouling or a damage. After the determination of the white level in the manner described above, the black level (L0 in FIG. 4) is then similarly determined.

After both the white level and the black level are determined, the gray level is then determined according to one of the following four methods (4) to (7):

(4) A gray level range is set so as to determine the gray level according to the manner similar to that used to determine the white level.

(5) The value intermediate between that of the white level and that of the black level is computed, and the value closest to this intermediate value (that is, the level where the adequate block exists) is determined as the gray level (L1 in FIG. 4).

(6) The value intermediate between that of the white level and that of the black level is computed, and the peak having the value closest to this intermediate value in the distribution of the adequate blocks is selected as the peak of the gray level. That level is determined as the gray level (L1 in FIG. 4).

(7) The level where the number of the adequate blocks is largest between the white level range and the black level range is determined as the gray level (L1 in FIG. 4).

After the white level, the black level and the gray level are determined as described above, the blocks corresponding to those levels respectively are determined. For this purpose, one of the following two methods (8) and (9) is used:

(8) At the time of selection of the adequate blocks, the average values in the individual adequate blocks respectively are computed together with their locations, and all the information regarding the average values and the locations are stored in a memory. After the white level, the black level and the gray level are determined, the locations corresponding to the individual levels respectively are selected to be used as individual level measurement regions during execution of the color balance automatic setup.

(9) The method (8) described above requires a large memory capacity for storing the many information. This requirement for the large memory capacity can be avoided by the method which will be described now. FIG. 4 shows the distribution of the average values in the selected adequate blocks. In the method avoiding the requirement for the large memory capacity, the average values in the selected adequate blocks and their locations are not stored in the memory. According to this method, after the white level, the black level and the gray level are determined on the basis of the distribution of the average values of the data in the individual adequate blocks, the individual level measurement regions for the purpose of automatic setup are determined by newly measuring the blocks corresponding to the individual levels.

For example, when the white level is detected to be 300, an allowable range E1 for the white level is set, and the locations of the adequate blocks where the maximum value and the minimum value of the data in the adequate blocks lie within the range of 300±E1 are newly detected. The locations thus detected are used to determine the white level measurement region. The black level measurement region and the gray level measurement region are similarly determined. In the manner described above, the white level measurement region, the black level measurement region and the gray level measurement region are automatically detected.

A second embodiment of the method according to the present invention will now be described. In the case of the first embodiment of the method, the distribution of the number of the adequate blocks is detected as described by reference to FIG. 4, and, on the basis of the distribution thus detected, the white level, the black level and the gray level are determined. However, in the case of the second embodiment, the individual levels are detected without detecting the distribution of the number of the adequate blocks.

First, the adequate blocks are selected as in the case of the first embodiment. As soon as the adequate blocks are selected, both the maximum value and the minimum value of the average values of adequate blocks are detected, and the locations of the corresponding blocks are stored in the memory. When the detected maximum value of the average values of any one of the adequate blocks lies in the white level range, the corresponding blocks are determined to belong to the white level, and the system decides that the locations of the corresponding blocks are included in the white level measurement region. Similarly, when the minimum value of the average values of any one of the adequate blocks lies in the black level range, the corresponding blocks are determined to belong to the black level, and the system decides that the locations of the corresponding blocks are included in the black level measurement region.

After the determination of the white level and the black level, the gray level measurement region is determined by one of the following methods (10) and (11):

(10) The gray level range is determined beforehand, and, while selecting the adequate blocks, whether or not the average value of the data in each of the selected blocks lies in the gray level range is checked. When the blocks belonging to the gray level range are detected, the system decides that those blocks are included in the gray level measurement region.

(11) The method is similar to that described in (10), but differs from the latter in that the values of both the white level and the black level are used for the purpose of determination of the gray level. For example, the value intermediate between that of the white level and that of the black level is computed, and this intermediate value is based to determine the gray level range covering a predetermined range on both sides of the intermediate value. After this determination of the gray level range, the gray level measurement region is determined in the manner similar to that described in (10).

It will be understood from the foregoing detailed description that, according to the present invention, the data measurement regions for the purpose of color balance automatic setup can be automatically detected. Therefore, the operator need not make troublesome positioning of the reference chart board relative to the TV camera, so that the shape and size of the reference patterns used for the purpose of determination of the white, black and gray levels are in no way limited. Also, even when the reference chart board may be partly fouled or damaged, most suitable pattern locations except such a fouled or damaged pattern location on the chart board can be used for the detection of the measurement regions, so that the chart board can be reliably used for the purpose of color balance automatic setup, and the operation required for the color balance adjustment can be greatly simplified.

What is claimed is:

1. A method of automatically adjusting color balance of a TV camera, comprising the steps of:
    picking up by a TV camera, an image of a chart board having an image region of a white level, an image region of a black level and an image region of a gray level to generate an image signal;
    dividing the image signal into a plurality of blocks;
    selecting adequate blocks corresponding to a white level, a black level and a gray level based on signal levels of the individual blocks; and
    determining the white level, the black level and the gray level based on the signal levels of the selected adequate blocks and measurement regions for the white level, the black level and the gray level, respectively, and automatically adjusting the color balance, each of said measurement regions including at least one adequate block.

2. A method according to claim 1, wherein said selecting step includes selecting as the adequate blocks, ones having the highest signal levels from among the blocks having the signal levels in the predetermined level ranges of the white level, the black level and the gray level, respectively.

3. A method according to claim 1, wherein said selecting step includes selecting as the adequate blocks, ones located in the peaks of signal level distributions and having the highest signal levels from among the blocks having the signal levels in the predetermined level ranges of the white level, the black level and the gray level, respectively.

4. A method according to claim 1, wherein said selecting step includes selecting as the adequate blocks, ones of the peak distributions of the signal levels from among the blocks having signal levels in predetermined level ranges of the white level, the black level and the gray level, respectively.

5. A method according to claim 1, wherein said selecting step includes selecting as the adequate blocks of the gray level, the blocks distributed at the signal level closest to an average value of a white signal level of the white-level adequate blocks and a black signal level of the black-level adequate blocks.

6. A method according to claim 1, wherein said selecting step includes selecting as the adequate block of the gray level, the blocks of the peak block distribution in vicinity of an average value of a white signal level of the white-level adequate blocks and a black signal level of the black-level adequate blocks.

7. A method according to claim 1, wherein said selecting step includes selecting as the adequate block of the gray level, the blocks of the peak block distribution between a white signal level of the white-level adequate blocks and a black signal level of the black-level adequate blocks.

8. A method according to claim 1, wherein said dividing step includes storing information regarding locations of the individual blocks in a memory together with the corresponding signal levels of the individual blocks, and wherein said determining step includes determining the measurement regions for the white level, the black level and the gray level by use of the information regarding the locations of the individual adequate blocks; and adjusting the color balance based on the signal levels of the determined measurement regions.

9. A method according to claim 1, wherein said determining step includes determining the measurement regions for the white level, the black level and the gray level based on the information regarding the locations of the individual adequate blocks, and wherein said automatically adjusting step includes automatically measuring the signal levels of the individual measurement regions; and automatically adjusting the color balance according to the measured signal level.

10. A system for automatically adjusting color balance of a TV camera, comprising:
TV camera means for imaging a chart board having an image region of a white level, an image region of a black level and an image region of a gray level to generate an image signal;
measurement region determining means for dividing the image signal into a plurality of blocks, for selecting adequate blocks corresponding to the white level, the black level and the gray level based on signal levels of the individual blocks and for determining measurement regions for the white level, the black level and the gray level based on the selected adequate blocks for the white level, the black level and the gray level, each of said measurement regions including at least one adequate block; and
adjusting means for adjusting color balance based on the white level, the black level and the gray level of the determined measurement regions.

* * * * *